United States Patent [19]

De Jager et al.

[11] 3,758,861

[45] Sept. 11, 1973

[54] SYSTEM FOR THE TRANSMISSION OF INFORMATION AT VERY LOW SIGNAL-TO-NOISE RATIOS

[75] Inventors: Frank De Jager; Leo Eduard Zegers; Nicolaas Alphonsus Maria Verhoeckx, all of Emmasingel, Eindhoven, Netherlands

[73] Assignee: U.S. Philips Corporation, New York, N.Y.

[22] Filed: July 8, 1971

[21] Appl. No.: 160,749

[30] Foreign Application Priority Data

July 25, 1970 Netherlands ...................... 7011049

[52] U.S. Cl. .................... 325/38 R, 178/68, 325/42

[51] Int. Cl. ............................................ H04b 1/00

[58] Field of Search ................ 325/38, 41, 42, 321, 325/30; 178/68

[56] References Cited

UNITED STATES PATENTS

| | | | |
|---|---|---|---|
| 3,633,105 | 4/1972 | Lender et al. | 325/42 |
| 3,518,547 | 6/1970 | Filopowsky | 325/42 |
| 3,482,044 | 12/1969 | Kaneko | 325/42 X |
| 3,314,015 | 4/1967 | Simonet | 325/42 X |

*Primary Examiner*—Charles D. Miller
*Attorney*—Frank R. Trifari

[57] ABSTRACT

The invention relates to a transmission system comprising a transmitter and a receiver for the transmission of information signals, the transmitter including a modulator coupled to the information signal source and the receiver including a detector coupled to the information signal user.

8 Claims, 8 Drawing Figures

PATENTED SEP 11 1973 3,758,861

INVENTORS
FRANK DE JAGER
LEO E. ZEGERS
NICOLAAS A.M. VERHOECKX
BY
[signature]
AGENT INVENTORS
FRANK DE JAGER
LEO E. ZEGERS
NICOLAAS A.M. VERHOECKX
BY
Frank R. Trifari
AGENT INVENTORS
FRANK DE JAGER
LEO E. ZEGERS
NICOLAAS A.M. VERHOECKX
BY
Frank R. Trifari
AGENT INVENTORS
FRANK DE JAGER
LEO E. ZEGERS
NICOLAAS A.M. VERHOECKX
BY
[signature]
AGENT INVENTORS
FRANK DE JAGER
LEO E. ZEGERS
NICOLAAS A.M. VERHOECKX
BY
[signature]
AGENT

PATENTED SEP 11 1973 3,758,861

SHEET 6 OF 6

INVENTORS
FRANK DE JAGER
LEO E. ZEGERS
NICOLAAS A.M. VERHOECKX
BY

AGENT

SYSTEM FOR THE TRANSMISSION OF INFORMATION AT VERY LOW SIGNAL-TO-NOISE RATIOS

If information is to be transmitted through transmission paths having moderate transmission conditions different non-linear modulation methods, such as FM, PPM and PCM are available. In non-linear methods moderate signal-to-noise ratios at the input of the receiver result in higher signal-to-noise ratios at the output of the detector than when using linear modulation methods such as AM, DSB and SSB. However, for signal-to-noise ratios in the order of 10 dB a threshold occurs when using these non-linear modulation methods and below this threshold the signal-to-noise ratios at the output of the detector are considerably lower than those used in linear modulation methods.

The object of the present invention is to provide a novel conception of a transmission system for reliable transmission of information through transmission paths having very poor transmission conditions, for example, signal-to-noise ratios in the order of −10 dB, which transmission system is particularly suitable for integration in a semiconductor body due to its digital structure.

According to the invention, the transmission system is characterized in that the modulator is formed as a state modulator of a pulse pattern generator controlled by a clock pulse generator. The pulse pattern generator generates a periodic binary pulse pattern and goes through a cycle of different generation states in the rhythm of the clock pulses. Each generation state corresponds to a binary value "1" or "0" of the generated pulse pattern within which the binary values occur in an irregular alternation in the rhythm of the clock-pulses. The state modulator furthermore includes a coder coupled to the information signal source for producing a quantized control signal characterizing the information signals to be transmitted, and a control circuit connected to the pulse pattern generator which control circuit effects a jump-transition in the pulse pattern at the output of the state modulator in consecutive time intervals which are equal to an integral number of periods of the periodic pulse pattern by causing the pulse pattern generator to jump from the existing generation state to a generation state determined by the control signal. The detector is formed as a jump-transition detector for the received pulse patterns, and includes a product modulator an input of which is connected to a local pulse pattern generator corresponding to the pulse pattern generator in the transmitter. The is connected to an integrating network. The jump-transition detector furthermore includes a local control circuit operating in synchronism with the control circuit in the transmitter. The local control circuit produces at the end of each of the said time intervals following the jump-transitions in the received pulse pattern a local control signal determined by the jump-transitions. The local control signal for the purpose of recovering the original information signals is applied to a decoder coupled to the information signal user.

In order that the invention may be readily carried into effect, some embodiments thereof will now be described in detail by way of example, with reference to the accompanying diagrammatic drawings, in which:

FIG. 1 shows a transmission system according to the invention while

Figure 1:
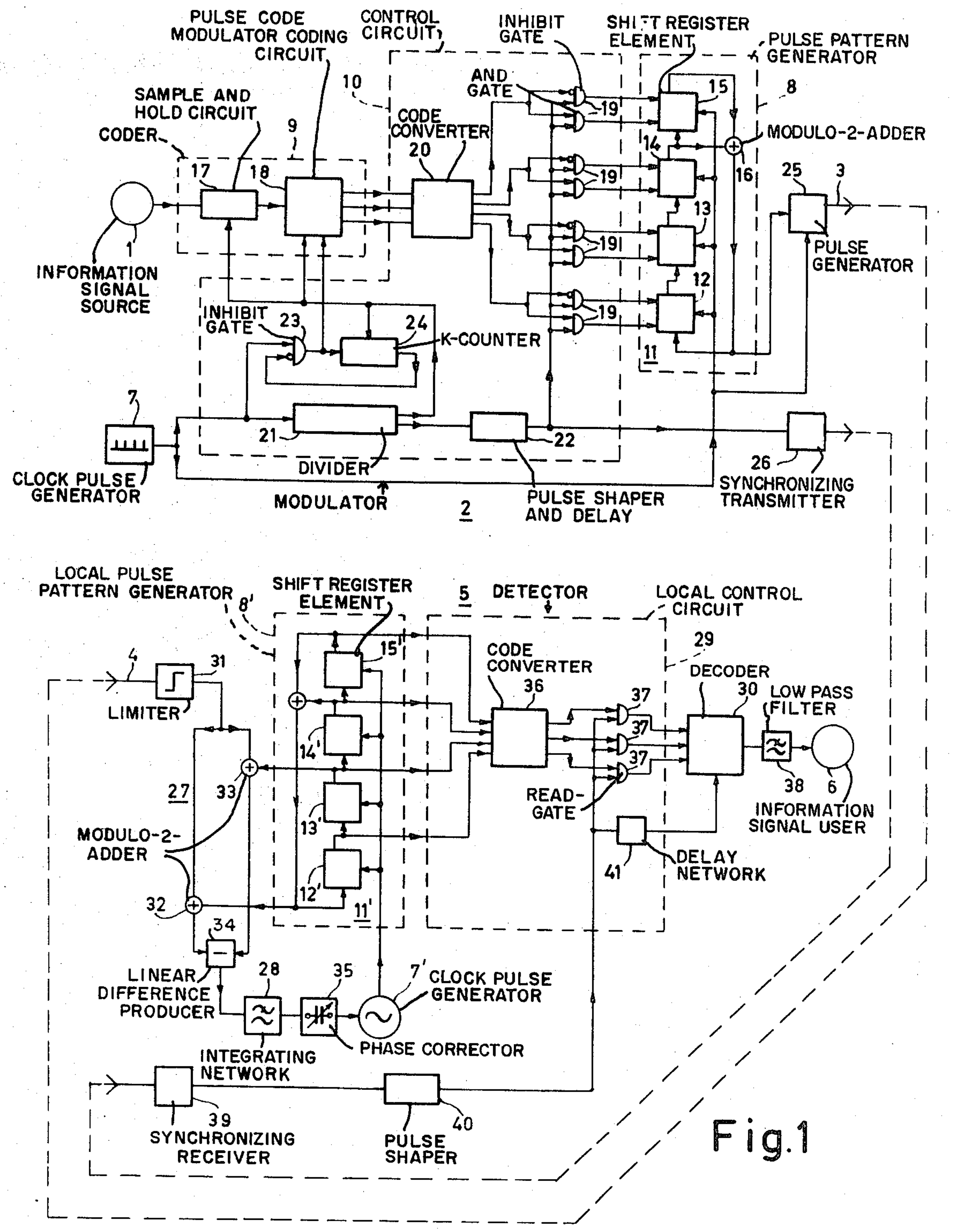

FIG. 1 shows a transmission system according to the invention which system is provided with a transmitter and a receiver for the transmission of a speech signal in a frequency band of, for example, 300–3400 Hz. In this transmission system the speech signal originating from an information signal source 1 is applied at the transmitter end to a modulator 2 coupled to the signal source 1 and the modulated signal is passed on through a line 3 to a transmission path not further shown in which, if required, a frequency transposition may be effected. At the receiver end the transmitted modulated signal transposed to the original frequency band, if necessary, is applied through a line 4 to a detector 5 and the detected speech signal is passed on to the information signal user 6 coupled to the detector 5.

In order to realize a reliable transmission of the speech signal through transmission paths having very unfavorable signal-to-noise ratios in the mentioned transmission system, the modulator 2 according to the invention is formed as a state modulator of a pulse pattern generator 8 controlled by a clock pulse generator 7, said pulse pattern generator 8 generating a periodic binary pulse pattern and going through a cycle of different generation states in the rhythm of the clock pulses. Each state corresponds to a binary value 1 or 0 of the generated pulse pattern within which the binary values occur in an irregular alternation in the rhythm of the clock pulses. Furthermore, the state modulator 2 includes a coder 9 coupled to the signal source 1 for producing a quantized control signal characterizing the speech signal 1 to be transmitted, and a control circuit 10 connected to the pulse pattern generator 8. The control circuit effects a jump-transition in the pulse pattern at the output of the state modulator 2 in consecutive time intervals equal to an integral number of periods of the periodic pulse pattern by causing the pulse pattern generator 8 to jump from the existing generation state to a generation state determined by the control signal.

In the embodiment shown in FIG. 1, the pulse pattern generator 8 in the transmitter is formed as a maximum-length-shift-register-sequence generator in the form of a feedback shift register 11 having a plurality of shift register elements 12, 13, 14, 15, whose contents are shifted at a constant shift period D by the clock pulse generator 7, and a modulo-2- adder 16 connected to the outputs of the third and fourth shift register elements 14 and 15, respectively. The output of the modulo-2- adder 16 is connected to the input of the first shift register element 12. Furthermore, the pulse pattern generator 8 is provided with a second feedback not further shown in FIG. 1, for preventing the continuation of the unwanted generation state in which all shift register elements 12–15 contain a pulse of the binary value "0".

Figure 2A:
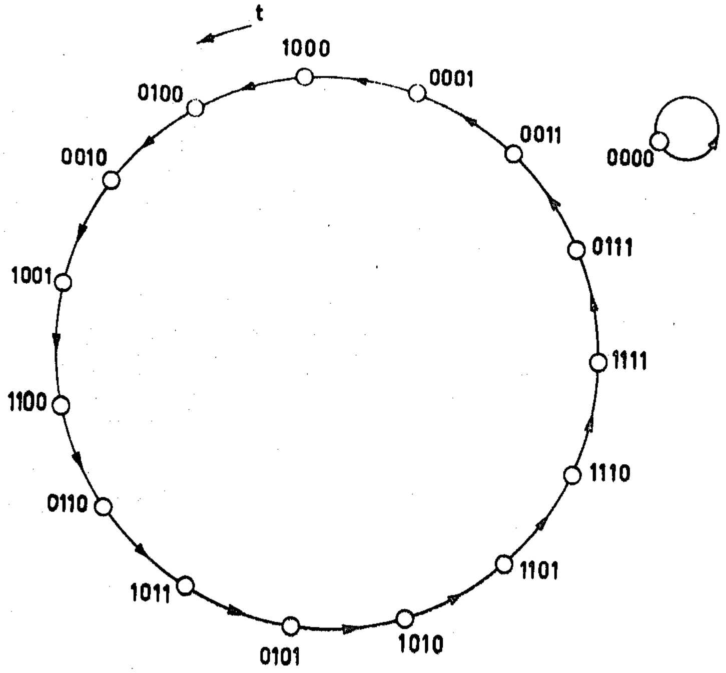
FIG. 2 shows a state diagrams and 2b-2c show two time diagrams to explain the transmission system of FIG. 1.
Figures 2B, 2C:
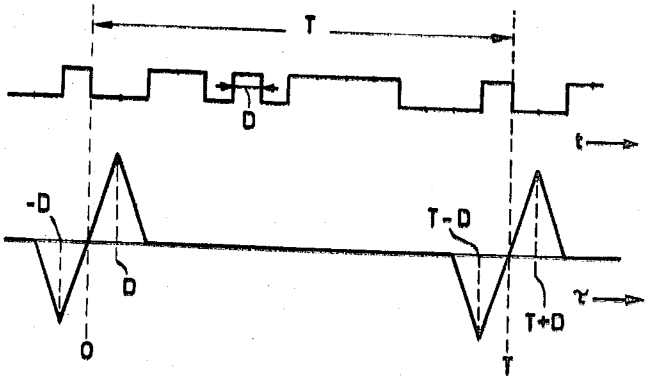

When, for example, the shift register element 12 contains a pulse of the binary value 1 in the starting state of the pulse pattern generator 8, and each of the other shift register elements 13, 14, 15 contains a pulse of the binary value 0, a pulse having the binary value "0" occurs at the output of the modulo-2-adder 16 which pulse is shifted to the element 12 at the next clock pulse, while the contents of the elements 12, 13 and 14 are shifted by this clock pulse to the elements 13, 14, 15. As a result the pulse pattern generator 8 changes from its starting state 1000 given by the contents of the shift register 11 to its next generation state 0100. A pulse of the binary value 0 then again occurs at the output of the modulo-2- adder 16 and the transition to the generation state 0010 takes place at the next clock pulse. In this manner the pulse pattern generator 8 will go through a cycle of different generation states in the rhythm of the clock pulses as a result of the feedback through the modulo-2- adder 16 until the starting state 1000 occurs again and the cycle is repeated. Each generation state of this closed cycle corresponds to a certain pulse of the binary value 1 or 0 of the periodical pulse pattern generated by the pulse pattern generator 8. Particularly it may be mathematically shown that when using *n* shift register elements in cascade and when suitably choosing the modulo-2-feedback, this cycle comprises $(2^n-1)$ different generation states and the generated binary pulse pattern has a period $T = (2^n-1)D$ in which D is the length of the shift period. In the pulse pattern generator 8 in FIG. 1, in which $n = 4$, the cycle comprises $(2^4-1) = 15$ generation states and the period T of the pulse pattern is $(2^4-1)D = 15$ D. In FIG. 2*a* the cycle of different generation states is shown together with the contents of the shift register 11 associated with each state, as well as the unwanted cycle prevented by the second feedback which cycle only comprises the generation state 0000; in FIG. 2*b* one period having a length of T of the generated pulse pattern is shown starting from the commencing state 1000.

The coder 9 of FIG. 1 includes a sample-and-hold circuit 17 which samples the speech signal in the rhythm of sampling pulses derived from the clock pulses; the sampling frequency is, for example 8 kHz in the mentioned frequency band of the speech signal of 300 – 3400 Hz. The samples thus obtained are applied to a PCM-coding circuit 18 in which they are converted into a code group characterizing the relevant sample and comprising *k* code elements which mutually differ by a weight factor of 2, in which $2^k$ different amplitude values of the samples are distinguished. Thus, in the PCM-coding circuit 18 of FIG. 1, in which $k = 3$, $2^3 = 8$ amplitude values of the speech signal can be distinguished. The k code elements of a code group occur simultaneously in the PCM-coding circuit 18 of FIG. 1, each element occurring at its own output line. The structure of the PCM-coding circuit 18 is not further shown in FIG. 1, because it is generally known.

The code groups occurring in the rhythm of the sampling frequency at the output of the PCM-coding circuit 18 are subsequently applied as control signals to the control circuit 10 connected to the pulse pattern generator 8 and utilized therein so as to cause the pulse pattern generator 8 to jump from the existing generation state to a generation state determined by the code groups. To this end write gates 19 to which the code element to be written in and its complement are applied are connected both to the set input and to the reset input of each shift register element 12–15 in the pulse pattern generator 8. In FIG. 1, for example, the write gate 19 connected to a set input is formed as an AND-gate and the write gate 19 connected to a reset input is formed as an inhibitor gate whose inhibiting terminal is connected to an input of the said AND-gate, while the code element to be written in is applied to the mutually connected inputs.

In the embodiment of the transmitter shown the code groups comprising *k* code elements originating from the PCM-coding circuit 18 are applied to a code converter 20 prior to writing in the shift register elements 12–15. The code converter converts the code groups comprising k code elements into code groups comprising *n* code elements, in which *k* is smaller than *n*, and *n* is equal to the number of shift register elements 12–15 of the shift-register 11. The structure of the code converter is not further shown because any arbitrary type of code converter may be used provided that it is ensured that the zero group, that is to say, the code group in which all *n* code elements have the binary value 0 does not occur at the output of the code converter. In this case the pulse pattern generator 8 jumps to the unwanted generation state. This may be realized, for example, by ensuring that the zero group cannot occur or, for example, by choosing a code in which this zero group does not occur such as, for example, a constant-ratio code.

In the control circuit 10 of the transmitter shown the pulses required for controlling the coder 9 and the write gates 19 are also derived from the clock pulses of clock pulse generator 7. To this end a divider 21 is connected to the clock pulse generator 7. The divider generates two series of pulses having a period of pT from the series of clock pulses of the period D, in which p is an integer and $T = (2^n-1)D$, the period of the pulse pattern of pulse pattern generator 8. In the transmitter of FIG. 1 *p* is chosen to be, for example, 5. The sampling pulses for controlling the coder 9 are derived from an output of the divider 21, while the pulses occurring at the other output of the divider 21 are applied as control pulses to the write gates 19 through a pulse shaper 22. In this case the pulses applied to the pulse shaper 22 occur at an earlier instant than the sampling pulses, while the control pulses of short duration formed in pulse shaper 22 encounter a delay in this shaper such that they occur exactly between two successive clock pulses. Thus it is achieved that the code group characterizing a sample is written in the pulse pattern generator 8 before the coder 9 handles the next sample. In addition ambiguities during writing-in in the pulse pattern generator 8 as a result of the coincidence of clock pulses with set and reset pulses are avoided. By choosing the division factor of divider 21 to be equal to $p(2^n-1)$ it is also realized that the jump-transitions controlled by the code groups in the pulse pattern occurring at the output of the state modulator 2 are effected during successive time intervals equal to an integral number of periods *p*T of the pulse pattern, because $T = (2^n-1)D$.

The coding pulses required for coding a sample in the PCM-coding circuit 18 are also generated in the control circuit 10 in the embodiment shown. To this end the clock pulses are applied through an inhibitor gate 23 to the PCM-coding circuit 18 and also to a *k*-counter 24 the output of which is connected to the inhibiting terminal of the inhibitor gate 23. The sampling pulses are also applied as reset pulses to the *k*-counter 24. In this manner the inhibitor gate 23 is opened after the occurrence of a sampling pulse and the clock pulses are passed on as coding pulses to the PCM-coding circuit 18 and are also counted in the $k$-counter 24 which thus reaches its final position after $k$ clock pulses and, by closing the inhibitor gate 23, prevents the further passage of the clock pulses to the PCM-coding circuit 24 until after the instant of occurrence of the next sampling pulse.

Furthermore, a pulse regenerator 25 is connected in the transmitter of FIG. 1 to the pulse pattern generator 8. The regenerator 25 is constituted, for example, by a shift register element which is also controlled by the clock pulse generator 7. It is achieved thereby that the transitions between the generation states of the pulse pattern generator 8, which transitions are effected by the code groups and are timed by the control pulses which occur exactly between two successive clock pulses, only cause a jump-transition in the pulse pattern at the output of the transmitter when the next clock pulse occurs. The pulses in the pulse pattern to be transmitted to the receiver thereby occur in the rhythm of the clock pulses. In addition to this pulse pattern information regarding the instant of occurrence of the control pulse for the write gates 19 is transmitted from the transmitter to the receiver. In the embodiment shown in FIG. 1 this is effected with the aid of a synchronizing transmitter 26 connected to the pulse shaper 22, which transmitter 26 transmits the relevant information, for example, in the form of a pilot signal co-transmitted with the pulse pattern in a narrow frequency band or transmits this information in another known manner, for example, through a separate transmission path having satisfactory transmission conditions.

In the receiver of the mentioned transmission system the detector 5 is formed according to the invention as a jump-transition detector for the received pulse patterns and is provided with a product modulator 27 an inut of which is connected to a local pulse pattern generator 8′ corresponding to the pulse pattern generator 8 in the transmitter. The output of the local pulse pattern generator is connected to an integrating network 28. Furthermore, the jump-transition detector 5 includes a local control circuit 29 operating in synchronism with the control circuit 10 in the transmitter. The local control circuit 10 produces at the end of each of the said time intervals following the said jump-transitions in the received pulse pattern a local control signal determined by the jump-transitions. The local control signal is applied to a decoder 30 coupled to the information signal user 6 for the purpose of recovering the original speech signal.

In the receiver shown the local pulse pattern generator 8′ is formed in the same manner as the pulse pattern generator 8 in the transmitter, in which corresponding elements in FIG. 1 have the same reference numerals. The reference numerals used for the receiver are however provided with indices. Furthermore, the product modulator 27 has a digital and double structure, namely the product modulator 27 includes a limiter 31 with which the signals derived from line 4 are converted into binary signals, and two modulo-2-adders 32, 33. The first inputs of the modulo-2 adders 32, 33 are connected in parallel to the outputs of the limiter 31. The outputs of the modulo-2-adders are also connected to a linear difference producer 34 whose output is connected to the integrating network 28. The local pulse pattern applied to the input of the shift register element 12′ is also applied to the second input of the modulo-2-adder 32, while the local pulse pattern delayed over two shift periods D and occurring at the output of the shift register element 13′ is applied to the second input of the modulo-2-adder 33. The output signal from the integrating network 28 controls a phase corrector 35 formed, for example, as a variable reactance of an oscillator 7′ acting as a local clock pulse generator.

When the received and locally generated pulse patterns are applied to the product modulator 27, an integration signal will be produced at the output of the integrating network 28 whose time constant is at least of the same order as the period T of the pulse pattern. As a function of the time shift $\tau$ of the local pulse pattern at the output of shift register element 12′ relative to the received pulse pattern, this integration signal has the variation shown in FIG. 2 at $c$ with a radial symmetry for $\tau = 0$, and with a period equal to T. By applying this integration signal as a control signal to the phase corrector 35 an accurate phase stabilization of the local clock pulse generator 7′ on the phase of the received pulse pattern is obtained. In that case a phase stabilization of the local clock pulse generator 7′ occurs during two clock periods only, notably for a phase relation which corresponds to the rising portion of the curve shown at $c$ in FIG. 2, while no phase stabilization occurs outside of this interval. The double structure of the product modulator 27 provides the advantage of a very favorable phase-stabilizing characteristic. After the phase stabilization of the local clock pulse generator 7′ on the phase of the received pulse pattern has taken place, the local and received pulse patterns coincide so that, apart from the transit time delay in the transmission path, the pulse pattern generators at the transmitter and receiver ends 8 and 8′ are in the same generation state at any instant.

In the receiver shown the local control circuit 29 is constituted as a read circuit of the pulse pattern generator 8′. After phase stabilization is obtained the read circuit 29 applies a local control signal to the decoder 30 at the end of each time interval having a length of pT and following a jump-transition in the received pulse pattern. This local control signal has to correspond to the code group of $k$ code elements at the output of the PCM-coding circuit 18 in the transmitter, which code group has in fact brought about the relevant jump-transition in the pulse pattern. To this end the read circuit 29 in the receiver of FIG. 1 is connected to the outputs of the shift register elements 12′ – 15′ of the local pulse pattern generator 8′. The pulse occurring at these outputs constitute code groups having $n$ code elements which characterize the contents of the shift register 11′ and thus the instantaneous generation state of the local pulse pattern generator 8′. The code groups having $n$ code elements are then applied to a code converter 36 which is constituted as an inverse circuit of the code converter 20 in the transmitter and which converts these code groups having $n$ code elements into code groups having $k$ code elements. The code groups having $k$ code elements thus obtained are then applied with the aid of a read gate 37 for each code element to the decoder 30. In the decoder 30, which is constituted as a PCM-decoding circuit associated with the PCM-coding circuit 18 in the transmitter, these code groups having $k$ code elements are converted into a sample of the speech signal corresponding to the relevant code group. The original speech signal is recovered from the samples at the output of the PCM-decoding circuit 30 by means of a lowpass filter 38 and is then passed on to the information signal user 6.

The control pulses for the control of the read gates 37 and the PCM-decoding circuit 30 in the receiver are derived from the information which is transmitted by the synchronizing transmitter 26 and contains information about the instant of occurrence of the control pulses for the write gates 19 in the transmitter. This information is recovered with the aid of a synchronizing receiver 39 which dependent on the type of synchronizing transmitter 26 used, has, for example, the form of a pilot selection filter or a phase-locked loop operating as such, or it is formed in another known manner. This information is converted into control pulses of short duration with the aid of a pulse shaper 40 which control pulses have to encounter a delay in the pulse shaper 40 such that on the one hand they occur exactly between two successive local clock pulses of the phase-stabilized local clock pulse generator 7' and on the other hand they occur at the end of the time interval having a length of pT following a jump-transition in the received pulse pattern just when the local pulse pattern generator 8' is in the same generation state as the pulse pattern generator 8 in the transmitter immediately after writing in a code group. In the receiver shown the control pulse than has to occur over a time interval $pT - D/2$ after a jump-transition in the received pulse pattern. As the jump-transition in the transmitted pulse pattern occurs a time interval $D/2$ later than the control pulse from pulse shaper 22 due to the use of the pulse regenerator 25 in the transmitter, a delay need not be introduced in the control pulses from pulse shaper 40 in the receiver shown. The control pulses from pulse shaper 40 are then directly applied to the read gates 37 and through a delay network 41 to the PCM-decoding circuit 30. As a result possible delays of the read gates 37 are compensated for so that the PCM-decoding circuit 30 indeed handles the code group just read out.

The operation of the transmission system as described will now be explained in greater detail with reference to FIG. 2.

Let it be assumed that a given sample in the PCM-coding circuit 18 is converted into a code group of $k$ code elements and that this code group is converted in the code converter 20 into a code group of $n$ code elements having, for example, the form 1000. At the next control pulse this code group 1000 is written in through the write gates 19 in the shift register elements 12 – 15. The contents of the shift register 11 then corresponds to the code group 1000 which thus determines the generation state of the pulse pattern generator 8 at the instant of occurrence of the control pulse. Under the control of the clock pulses from clock pulse generator 7, the pulse pattern generator 8 will then go through the cycle of different generation states shown at $a$ in FIG. 2, starting from the state given by the code group 1000. When the next control pulse occurs the pulse pattern generator 8 has just gone through its generation cycle for an integral number of times and is thus again in its starting state given by the code group 1000 because this control pulse occurs after a time interval $pT$ in which $T$ is the duration of the generation cycle and $p$ is an integer. If a code group of, for example, the form 1100 corresponds to the new sample, at the occurrence of the control pulse this code group 1100 causes the pulse pattern generator 8 to jump from the existing generation state, which is just equal to the starting state 1000, to the generation state 1100 so that the generation states 0100, 0010 and 1001 are skipped in the generation cycle (compare $a$ in FIG. 2) and the generation state 1100 constitutes the new starting state from which the pulse pattern generator 8 will go through its generation cycle for an integral number of times. For the subsequent control pulses the described procedure is then repeated for the code groups then occurring.

The code-group-controlled jumps of the pulse pattern generator 8 between its different generation states becomes manifest by the attendent sudden phase changes in the pulse pattern at the output of the transmitter; the pulse pattern will immediately occur in the phase determined by the relevant code group as soon as the clock pulse following a control pulse appears. In the transmitter shown in FIG. 1 the relationship between code group and an associated phase of the pulse pattern is expressed in its simplest form by the last $n$ pulses in successive periods of a length T as reckoned from the instant of the sudden phase change in the pulse pattern. This relationship results from the fact that these $n$ pulses always correspond to the contents of the shift register 11 in the starting state and hence to the relevant code group (compare $b$ in FIG. 2 in which the pulse pattern is shown in the phase which is associated with the occurrence of a code group 1000).

Let it be assumed that the local pulse pattern in the receiver coincides with the received pulse pattern in an arbitrary different phase, when the pulse pattern in the phase which is associated with the code group 1000 is received. As from this instant the received and local pulse patterns no longer coincide, the integration signal present during phase stabilization at the output of the integrating network 28 will fall off so that phase stabilization of the local clock pulse generator 7' no longer takes place. As a result of the frequency differences which are always present between the local clock pulse generator 7' and the clock pulse generator 7 in the transmitter, the local and received pulse patterns will then mutually shift and this shift will continue until the mutual time shift $\tau$ is within the interval $-D<\tau<D$ within which phase stabilization is effected, and the local clock pulse generator 7' stabilizes on the phase of the received pulse pattern associated with the code group 1000 (compare $c$ in FIG. 2). To promote a quick action of the phase control circuit after the occurrence of a sudden phase change in the received pulse pattern, the local clock pulse generator 7' is adjusted at a frequency which in case of absence of a control signal for phase corrector 35 slightly differs from the frequency of the clock pulse generator 7 in the transmitter.

In this manner phase stabilization is achieved within a time interval smaller than pT after the occurrence of a sudden phase change, whereafter the local and received pulse patterns coincide for the rest of the time interval of length pT after the occurrence of this sudden phase change, so that at the end of this last time interval both pulse pattern generators 8 and 8' will be in the same generation state. As already mentioned this generation state corresponds to the starting state determined by the code group 1000. The code group having $n$ code elements applied at that instant to the code converter 36 thus is the code group 1000 so that after code conversion in a code group having $k$ code elements and after decoding in the PCM-decoding circuit 30 a sample occurs which indeed corresponds to the sample applied to the PCM-coding circuit 18 in the transmitter and which is characterized by the code group 1000. For the next sample characterized by the code group 1100 the transmission by means of the described transmission system is effected in the same manner as described for the code group 1000.

In this manner a very reliable transmission of the speech signal is realized by using the steps according to the invention, even when this transmission is effected through transmission paths having very poor transmission conditions in which the signal-to-noise ratios at the input of the receiver are, for example, in the order of −10 dB.

As a result of the integration with the aid of the integrating network 28 whose time constant, as stated above, is in the order of the period T of the pulse pattern, the amplitude of the integration signal in case of phase stabilization of the local pulse pattern on the phase of the received pulse pattern will be proportional to the number of pulses present per period T in the pulse pattern, because then each pulse contributes to the integration. As a result it is possible to achieve this phase stabilization with great certainty also when the received pulse pattern at the input of the product modulator 27 has a very low level, for example, from 10 dB to 20 dB below the level of the noise. Unlike the received pulse pattern, the noise has no correlation at all with the local pulse pattern so that the contribution of the noise to the integration signal in case of integration over a time interval having a length of T will approach substantially zero, and this to an even closer extent as T assumes higher values, which is in contrast wit the contribution of the pulse pattern, this last contribution proportionally increasing with the length of the period in case of a longer pulse pattern having a large number of pulses.

In the transmission system according to the invention described hereinbefore the speech signal is transmitted with the aid of what may be briefly referred to as direct state modulation of the generation states of the pulse pattern generator 8, in which each quantized sample of the speech signal unambiguously corresponds to one of the generation states.

Figure 3:
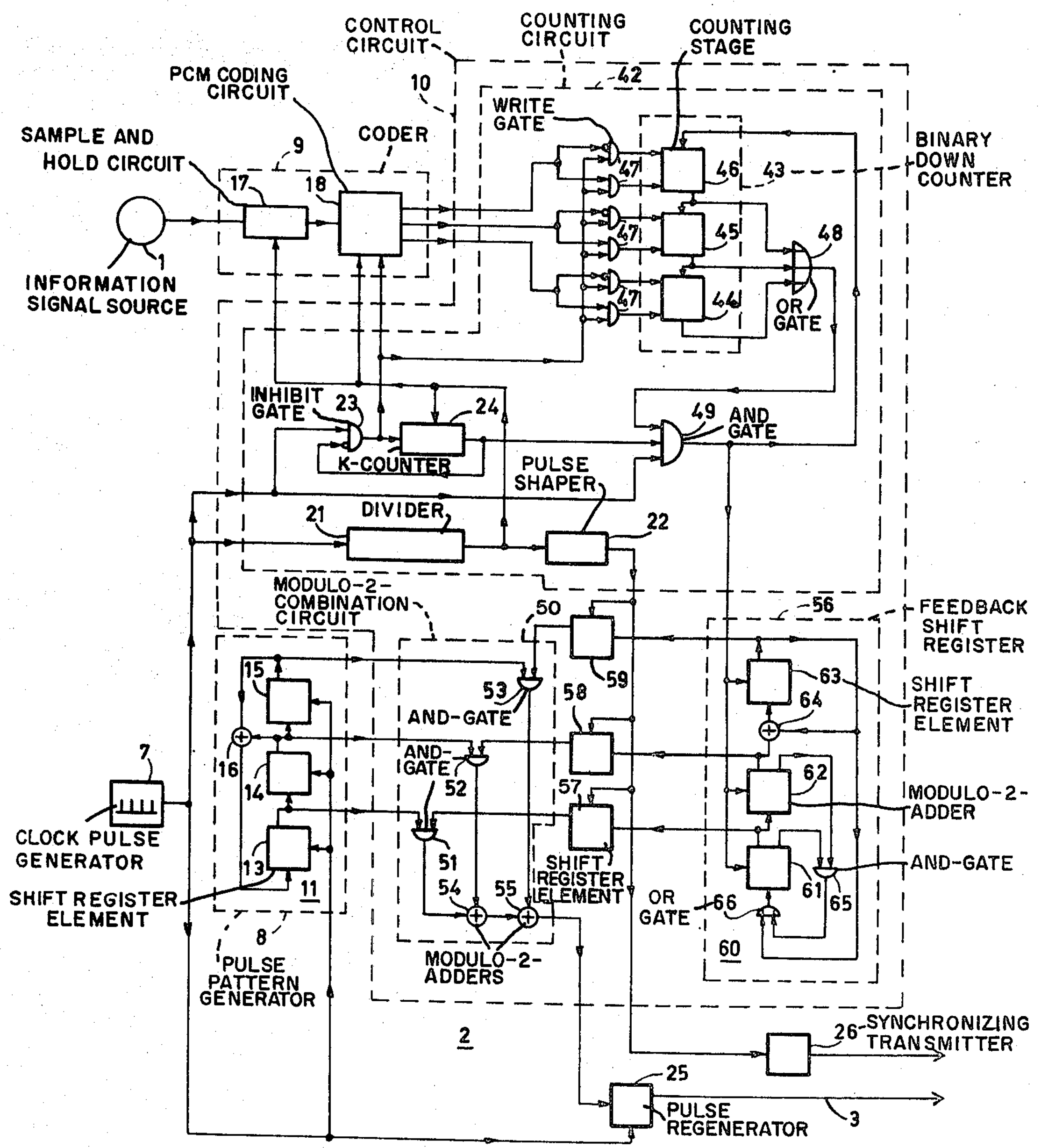
FIG. 3 shows a transmitter and FIG. 4 shows a receiver of a modification of the transmission system of FIG. 1, adapted for differential state modulation.
Figure 4:
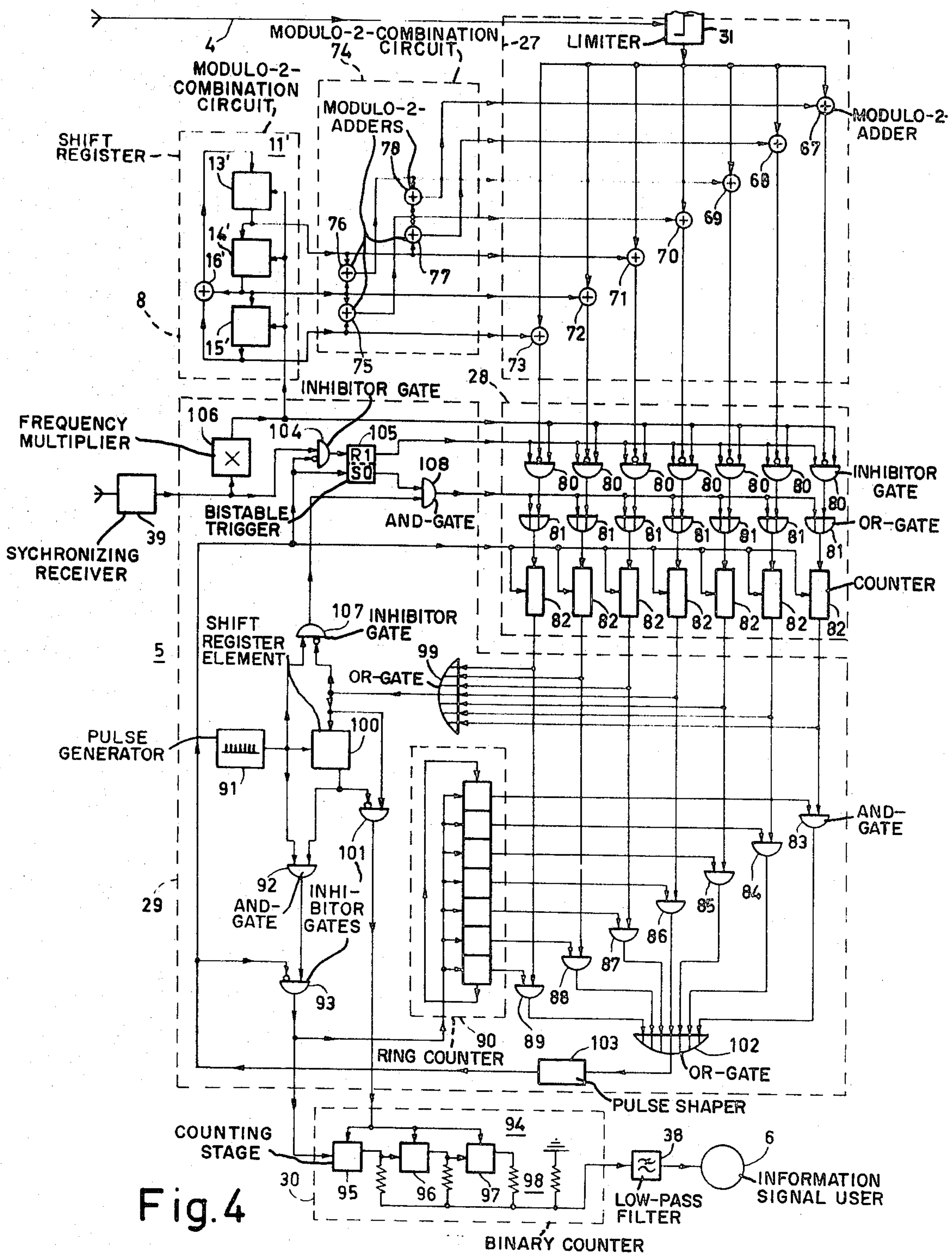

However, in a modification of the transmission system according to the invention the transmitter of which is shown in FIG. 3 and the receiver is shown in FIG. 4, the speech signal is transmitted with the aid of what may be referred to as differential state modulation of the generation states of the pulse pattern generator 8. This means that each quantized sample corresponds to a given number of generation states jumped by the pulse pattern generator 8 in its generation cycle, starting from the state associated with the previous sample. For the pulse pattern at the output of the transmitter this differential state modulation means that the information to be transmitted is not characterized by the absolute phase of the pulse pattern, but by the phase differences between adjacent pulse patterns. In FIG. 3 and FIG. 4 the elements corresponding to those in the transmitter and the receiver of FIG. 1 have the same reference numerals.

The essential difference between the transmitter according to FIG. 3 and that according to FIG. 1 resides in the structure of the control circuit 10. The pulse pattern generator 8 may be the same as that of FIG. 1, but for the sake of simplicity in FIG. 3, it has only 3 instead of 4 shift register elements, so that now the generation cycle comprises $(2^3-1)=7$ generation states and the period T of the pulse pattern is $(2^3-1)D=7D$.

In the transmitter of FIG. 3 the binary code groups at the output of the PCM-coding circuit 18 in the control circuit 10 are applied to a counting circuit 42 which together with the coder 9 operates as an amplitude-to-pulse-rate converter for the speech signal from signal source 1. In the counting circuit 42 the binary code groups are written in a binary down-counter 43 which in conformity with the number of code elements in a code group comprises three counting stages 44, 45, 46. To this end, a write gate 47 is connected to both the set input and the reset input of each counting stage 44–46 in the down-counter 43, to which write gate 47 the code element to be written in and its complement are applied; the write gates 47 are formed in the same manner as the write gates 19 in FIG. 1. The control pulses for the coder 9 are derived in the same manner as in the transmitter of FIG. 1 from the clock pulses from clock pulse generator 7. The code pulses are also applied as control pulses to the write gates 47. The last coding pulse causes the code group to be ultimately written in the down-counter 43. The outputs of the counting states 44–46 are connected through an OR-gate 48 to an input of an AND-gate 49, two further inputs of which are connected to the output of the *k* counter 24 and the clock pulse generator 7, respectively. The output of the AND-gate 49 is connected to the counting input of the down-counter 43. This output of the AND-gate 49 also constitutes the output of the counting circuit 42.

When a sample having an amplitude of, for example, 5 occurs, it is converted by the PCM-coding circuit 18 into the associated binary code group 101 which is completely written in in the binary down-counter 43 at the last coding pulse. The *k* counter 24 reaches its final position at the last coding pulse and then applies a pulse having a binary value of 1 to the AND-gate 49, which pulse continues until the occurrence of the next sample. After the code group 101 is written in in the down-counter 43, the OR-gate 48 also applies a pulse of the binary value 1 to the AND-gate 49 which then passes the clock pulses from clock pulse generator 7 under the control of the said two pulses. These clock pulses then occur at the counting input of the down-counter 43 and cause this counter to count down until the zero position is reached after 5 clock pulses, at which position the OR-gate 48 provides a pulse of the binary value 0 which prevents the further passage of the clock pulses due to the AND-gate 49 being closed. In this manner the amplitude value 5 of the speech signal at the output of the counting circuit 42 becomes manifest in the occurrence of exactly 5 clock pulses. Likewise, the occurrence of *x* clock pulses at the output of the counting circuit 42 correspond to a quantized amplitude value *x*.

In the transmitter according to FIG. 3 the pulse rate associated with a sample is utilized at the output of the counting circuit 42 in order to obtain the desired sudden phase change in the pulse pattern at the output of the transmitter. Unlike the transmitter of FIG. 1, in which the jumping of generation state is effected by modifying the contents of the shift register 11 in the pulse pattern generator 8, the contents of the shift register 11 are combined in this case with the aid of the modulo-2- combination circuit 50 connected to all shift register elements 13–15 under the control of the pulse rate of the connecting circuit 42 and this combination is effected in a manner characteristic of the number of generation states to be jumped in the cycle. In that case use is made of the known property of the type of pulse pattern utilized that modulo-2- combination of two phase-shifted versions thereof again yields a version of this pulse pattern in a phase different from these two phases, ("shift-and-add property"). In the modulo-2- combination circuit 50 shown the outputs of each shift register element 13, 14, 15 are connected to this end through AND-gates 51, 52, 53 operating as switches to a separate input of a multiple modulo-2- adder which in this case is constituted as the series arrangement of two modulo-2- adders 54, 55. The shift register elements 13, 14 are connected to the inputs of the modulo-2-adder 54 while the output of this modulo-2- adder 54 as well as the output of the shift register element 15 are connected to the modulo-2- adder 55 whose output also constitutes the output of the modulo-2- combination circuit 50. From the circuit 50 the pulse pattern to be transmitted is derived through the pulse regenerator 25. The combination in which the respective AND-gates 51, 52, 53 are either open or closed in case of a givn sample then determines which modulo-2- combination of the contents of the respective shift register elements 13, 14, 15 will occur.

Since differential state modulation is employed in the transmitter shown the pulse rate associated with a given sample is not only decisive of the occurring modulo-2-combination but also the modulo-2-combination associated with the previous sample. To achieve both purposes, the clock pulses at the output of the counting circuit 42 in the transmitter of FIG. 3 are applied to an adjusting circuit 56 for the modulo-2-combination circuit 50. The adjusting circuit 56 can assume a number of positions which correspond to the number of generation states in the cycle of the pulse pattern generator 8. Under the control of the clock pulses from the counting circuit 42 the adjusting circuit 56, starting from the existing position will assume a position determined by the clock pulse rate which position is then taken over with the aid of a control pulse from pulse shaper 22 in a register having three shift register elements 57, 58, 59, whose output signals control the AND-gates 51, 52, 53, respectively. The control pulses from the pulse shaper 22 must also have a delay relative to the sampling pulses such that the sample having the highest amplitude value can be handled in the amplitude-to-pulse-rate converter 9, 42 and in the adjusting circuit 56 before the position of the adjusting circuit 56 is taken over in the shift register elements 57, 58, 59, and furthermore such that this take-over is effected exactly between two successive clock pulses. In FIG. 3 this delay is, for example, at least $kD + T + D/2$ in which D is the clock pulse period. However, when the take-over is postponed until the occurrence of the next sampling pulse, the pulse shaper 22 itself need not introduce any delay in the control pulses.

In the transmitter shown the adjusting circuit 56 is constituted by a feed-back shift register 60 having the same number of elements 61, 62, 63 as the shift register 11 in the pulse pattern generator 8, the shift register 60 being provided with a modulo-2- feedback having a structure which is closely related to that of the modulo-2- feedback in the shift register 11. Particularly where in the shift register 11 the outputs of the second and third shift register elements 14 and 15 are connected to the input of the modulo-2- adder 16 whose output is connected to the input of the first shift register element 13. The outputs of the second and third shift register elements 62 and 63 in the shift register 60 are connected to the inputs of a modulo-2- adder 64, whose output is now, however, connected to the input of the third shift register element 63. In addition the output of the third shift register element 63 is connected to the input of the first shift register element 61. The clock pulses at the output of the counting circuit 42 are then applied as shift pulses to the shift register 60.

The feed-back shift register 60 thus obtained also has the structure of a maximum-length-shift-register-sequence generator having a closed cycle which comprises $(2^3-1)=7$ states given by the contents of the shift register 60. Unlike the pulse pattern generator 8, which in the transmitter of FIG. 3 passes its generation cycle uninterruptedly in the rhythm of the clock pulses from clock pulse generator 7, the generator 60 is operated intermittently because at each sample only a number of clock pulses corresponding to its amplitude value occurs at the output of the counting circuit 42. These clock pulses are passed as shift pulses to the generator 60. The second feedback for the purpose of preventing the unwanted state in which all shift register elements have a pulse of the binary value 0 may be effected in the same manner as in the pulse pattern generators 8 and 8' in FIG. 1 and FIG. 3. This second feedback, which is further shown in FIG. 3 for the generator 60, consists, for example, of an AND-gate 65 to which the complementary outputs of all shift register elements except the last are connected. AND-gate 65, likewise as the output of the last shift register element 63, is connected to the input of the first shift register element 61 through an OR-gate 66.

In the description of the transmission system of which the transmitter of FIG. 3 forms part, the operation of the transmitter will be dealt with further.

In the receiver of FIG. 4, which cooperates with the transmitter of FIG. 3, the digital product modulator 27 has a multiple structure, notably it includes a number of modulo-2- adders which is equal to the number of generation states in the cycle of the pulse pattern generators 8 and 8'. To this end the first inputs of seven modulo-2- adders 67, 68, 69, 70, 71, 72, 73 are connected in FIG. 4 in parallel to the output of the limited 31. The local pulse pattern is applied to the second inputs of these modulo-2- adders 67–73, which local pulse pattern occurs at the different modulo-2-adders in the phase corresponding to the different generation states, namely relative to the pattern at modulo-2- adder 67, delayed over a time interval *D* at modulo-2 adder 68, delayed over a time interval 2*D* at modulo-2 adder 69, etc. To obtain the different phases of the local pulse pattern a modulo-2-combination circuit 74 having four modulo-2- adders 75, 76, 77, 78 is connected to the outputs of all shift register elements 13', 14', 15' in the local pulse pattern generator 8'. In the structure of this modulo-2-combination circuit 74 of FIG. 4 use has been made of the property (already mentioned with reference to the transmitter of FIG. 3) that modulo-2- combination of two phase-shifted versions of the pulse pattern again yields a version of the pulse pattern in another phase. Thus the pulse pattern for the modulo-2- adder 67 is obtained by modulo-2-combination of the local pulse patterns at the outputs of the shift register elements 13′ and 15′. Likewise the pulse patterns for the modulo-2- adders 68, 69, 70 are obtained by modulo-2- combination of the local pulse patterns at the outputs of the shaft register elements 13′, 14′ and 15′; 13′ and 15′; 14′ and 15′, respectively, while the pulse patterns for the modulo-2- adders 71, 72, 73 are directly derived from the shift register elements 13′, 14′, 15′, respectively.

A multiple digital integrating network 28 is connected to the output of this multiple digital product modulator 27. In the integrating network 28 shown the output of each modulo-2- adder 67–73 is connected to the inhibiting terminal of an inhibitor gate 80 controlled by the local clock pulses which gate is connected through an OR-gate 81 to a counter 82 having $p(2^n-1)$ positions corresponding to the number of clock pulses in a sampling period.

When the received pulse pattern occurs in the phase in which the local pulse pattern, for example, the modulo-2- adder 68 occurs, an uninterrupted series of pulses of the binary value 0 will occur at the output of the modulo-2 adder 68, while pulses having a binary value 0 as well as pulses having a binary value 1 will occur at the outputs of the other modulo-2 adders 67, 69–73. If the counters 82 are reset to their zero positions when a jump-transition in the received pulse pattern occurs, only the counter 82 which is connected to the modulo-2 adder 68 will reach its final position at the end of the time interval having a length of pT following a jump-transition and this counter will provide a signal of the binary value 1 while the other counters 82 will not reach their final positions and hence will provide a signal of the binary value 0. Thus, the phase of the received pulse pattern becomes manifest in that only a signal having a binary value of 1 occurs at the output of the counter 82 which is connected to the modulo-2 adder 68 to which the local pulse pattern is applied in the same phase.

In the receiver of FIG. 4 the local control circuit 29 is constituted as a read circuit of the integrating network 28. To this end the outputs of each counter 82 are connected to AND-gates 83, 84, 85, 86, 87, 88, 89, each of the AND-gates 83-89 being controlled by a separate shift register element of a ring counter 90 whose shift register elements are interconnected in such a manner that at any instant a pulse of the binary value "1" occurs at the output of only one of the shift register elements. The counting pulses for the ring counter 90 are derived from a pulse generator 91 whose pulse frequency is higher than $p(2^n-1)/D$, which counting pulses are applied through an AND-gate 92 and a subsequent normally open inhibitor gate 93 to the ring counter 90. Likewise these counting pulses are applied to the PCM-decoding circuit 30 which in FIG. 4 is formed as a binary counter 94 which in accordance with the number of code elements in the code group from the PCM-coding circuit 18 in the transmitter of FIG. 3 comprises three counting stages 95, 96, 97 whose outputs are connected to a weighting network 98 having weighting factors for the different states 95, 96, 97 mutually differing by a factor of 2. The output of this weighting network 98 is connected through the lowpass filter 38 to the information signal user 6.

Furthermore the output of each counter 82 in the read circuit 29 is also connected to an OR-gate 99 whose output is connected to the input of a shift register element 100 to which the counting pulses from the pulse generator 91 are applied as shift pulses. The output of the shift register element 100 is connected to an input of the AND-gate 92 and also to the inhibiting terminal of an inhibitor gate 101 whose other input is directly connected to the output of the OR-gate 99, while the output of the inhibitor gate 101 is connected to the reset input of the counter 94 in the PCM-decoding circuit 30. In addition the outputs of the AND-gates 83–89 are connected to an OR gate 102 whose outout is connected through a pulse shaper 103 to the inhibiting terminal of the inhibitor gate 93 and also to the reset input of the counters 82 in the integrating network 28.

It is assumed that the phase of the received pulse pattern corresponds to the phase of the local pulse pattern applied to the modulo-2- adder 68 when the received pulse pattern the jump-transition occurs wich is associated with a sample having, for example, an amplitude value of 5 and thus with a binary code group 101 of the PCM-coding circuit 18 in the transmitter of FIG. 3. In this case the ring counter 90 is in the position in which a signal of the binary value 1 is provided at the input of the AND-gate 84. As a result of the jump-transition the phase of the received pulse pattern now corresponds to the phase of the local pulse pattern at the modulo-2 adder 73 so that at the end of the integration interval having a length of pT subsequent to this jump-transition exclusively the counter 82 connected to the modulo-2- adder 73 provides a signal of the binary value 1. The leading edge of this signal then causes the binary counter 94 in the PCM-decoding circuit 30 to be reset through the OR-gate 99 and the then open inhibitor gate 101. The shift pulse from the pulse generator 91 immediately following this leading edge causes this signal of the binary value 1 to be written in the shift-register element 100 so that on the one hand the inhibitor gate 101 is closed and on the other hand the AND-gate 92 is opened for the counting pulses from the pulse generator 91. These counting pulses are passed through the inhibitor gate 93 which is then likewise open to the ring counter 90 and also to the binary counter 94 in the PCM-decoding circuit 30. Under the influence of the counting pulses the ring counter 90 progresses from the position at which the AND-gate 84 is open until after 5 counting pulses the position is reached at which the ring counter 90 applies a pulse of binary value 1 to the AND-gate 89 to which also the signal of binary value 1 from the counter 82 connected to the modulo-2 adder 73 is applied. The signal then occuring at the output of AND-gate 89 and having the binary value 1 closes the inhibitor gate 93 through OR-gate 102 and pulse shaper 103 so that the further passage of the counting pulses to the ring counter 90 and the binary counter 94 is prevented while the leading edge of this signal also causes the counters 82 in the integrating network 28 to be reset. The number of counting pulses passed by the inhibitor gate 93, in this case 5, is counted in the binary counter 94. Since this number of counting pulses corresponds to the number of outputs of the integrating network 28 jumped by the signal of binary value 1 at this jump-transition in the received pulse pattern and since this number in turn corresponds to the number of generation states jumped in the generation cycle of the pulse pattern generators 8 and 8′, the contents of the binary counter 94 in the PCM-decoding circuit 30 exactly correspond to the binary code gqoup 101 of the PCM-coding circuit 18 in the transmitter. Subsequently the original sample having an amplitude value of 5 is recovered with the aid of the weighting network 98 from these contents given by the code group 101, which sample is passed on through the low-pass filter 38 to the information signal user 6. Since the pulse frequency of the pulse generator 91 is higher than $p(2^n-1)D$, the read circuit 29 will always be able to handle the integration results of the integrating network 28 within a period $D$.

The information about the instants at which jump-transitions in the transmitter of FIG. 3 take place, which information is recovered with the aid of the synchronizing receiver 39, is utilized in the receiver of FIG. 4 for the further control of the digital integrating network 28. Particularly, the control pulses of short duration derived from the synchronizing receiver 39 are used to indicate the end of the integration interval having a length pT while the leading edge of the signal of the binary value 1 at the output of OR gate 102, which as is apparent from the foregoing marks the end of handling the integration results, is used to indicate the beginning of a subsequent integration interval. The control pulses from the synchronizing receiver 39 are applied to this end in the local control circuit 29 of FIG. 4 through an inhibitor gate 104 to the reset input of a bistable trigger 105 whose output is connected to an input of the inhibitor gates 80. The output of the OR-gate 102 is connected through the pulse shaper 103 to the set input of this trigger 105 and also to the inhibiting terminal of the inhibitor gate 104. Thus, the control pulse closed the inhibitor gates 80 by resetting the trigger 105 and consequently terminates the integration interval, while the output signal from the OR-gate 102 opens these inhibitor gates 80 for a new integration interval by setting the trigger 105. In co-operation with the pulse shaper 103, which is formed, for example, as a monostable trigger and supplies pulses having a duration which is longer than a clock period D plus the duration of a control pulse, the inhibitor gate 104 prevents the trigger 105 from being reset if the output signal from OR-gate 102 occurs at an earlier instant than the control pulse at the end of the integration interval. In the most unfavorable case in which the phase of the received pulse pattern does not vary during two or more time intervals having a length pT the leading edge of this output signal from OR-gate 102 may substantially coincide with the beginning of the last pulse in a time interval having a length pT and may consequently occur approximately a clock period D earlier than the control pulse. Without the interposition of pulse shaper 103 and inhibitor gate 104 the next integration interval would then be shortened to one clock period D in which none of the counters 82 can reach its final position whereafter each further integration would become impossible because no output signal of binary value 1 can be provided by the OR-gate 102.

In the receiver of FIG. 4 the clock pulses for the local pulse pattern generator 8' are also derived from the control pulses from the synchronizing receiver 39 with the aid of a frequency multiplier 106 whose multiplication factor is $p(2^n-1)$. These clock pulses are also applied to an input of the inhibitor gates 80 which thereby act also as pulse regenerators for the pulses originating from modulo-2 adders 67–73.

Furthermore, it is ensured in the receiver shown that the counters 82 in the integrating network 28 can always reach their final position independently of the interferences in the transmission path which mutilate the received pulse pattern. To this end the counting pulses from the pulse generator 91 are applied through a normally open inhibitor gate 107 to an input of an AND-gate 108 the other input of which is connected to the complementary output of the bistable trigger 105 while the output of the AND-gate 108 is connected through the OR-gates 81 to the output of the counters 82. The inhibiting terminal of the inhibitor gate 107 is connected to the output of the OR-gate 99. As a result of the interferences in the transmission path the counter 82, which is connected to that one of the modulo-2- adders 67–73 at which the local pulse pattern occurs in the same phase as the receive pulse pattern, will not reach its final position at the occurrence of the control pulse at the end of an integration interval having a length of $pT$. The relevant counter 82, however, will then have counted the largest number of coincidences between the local pulse pattern in this phase and the received pulse pattern. The trigger 105 is then reset by the control pulse and the AND-gate 108 is opened for the counting pulses which then cause the counter 82 which has counted the largest number of coincidences to be first in reaching its final position. In its final position this counter 82 prevents the further application of counting pulses to all counters 82 by providing a signal of binary value 1 which closes the inhibitor gate 107 through the OR-gate 99. Thus, in spite of interferences in the transmission path the phase of the received pulse pattern can always be distinguished with great reliability. Also in this case the handling process in the read circuit 29 is effected entirely within a clock period D due to the above-mentioned high pulse frequency of the pulse generator 91.

The operation of the transmission system described with reference to FIG. 3 and FIG. 4 will be explained briefly hereinafter. Since the state modulation in this system is performed differentially, the state assumed at the previous sample constitutes the starting point for the transmission of a new sample of the speech signal.

Let it be assumed, for example, that in the transmitter of FIG. 3 the adjusting circuit 56 has assumed the state 100 given by the contents of the elements 61, 62, 63 of the shift register 60 at the previous sample. This state 100 was taken over in the shift register elements 57, 58, 59 at the previous control pulse from pulse shaper 22 so that only AND-gate 51 in the modulo-2-combination circuit 50 is open resulting in that the pulse pattern at the output of the transmitter corresponds to the pulse pattern at the output of the shift register element 13 in the pulse pattern generator 8. When a new sample occurs with, for example, an amplitude value of 5, the amplitude-to-pulse-rate converter 9, 42 will pass 5 clock pulses as shift pulses to the adjusting circuit 56 as already extensively described hereinbefore. The contents of the shift register 60 are than 5 times shifted whereafter this shift register 60 assumes the state 110 as can easily be checked. At the next control pulse this new state 110 is taken over in the shift register elements 57, 58, 59 so that the AND-gates 51 and 52 in the modulo-2-combination circuit 50 are opened. The pulse pattern at the output of the transmitter then corresponds to the modulo-2-combination of the pulse patterns at the outputs of the shift register elements 13 and 14 in the pulse pattern generator 8. As may readily be checked, this new pulse pattern is a version delayed over a time interval 5D of the pulse pattern at the output of the shift register element 13. In other words, the new sample having an amplitude value of 5 has effected a sudden phase change of the magnitude 5D in the transmitted pulse pattern.

In the receiver of FIG. 4 it is assumed that the received pulse pattern associated with the previous sample corresponds to the local pulse pattern at, for example, the modulo-2-adder 68 so that after handling the previous sample the ring counter 90 remains in the position in which the AND-gate 84 is open. However, when under the influence of the new sample of amplitude value 5 a sudden phase change of value 5D occurs in the received pulse pattern, this pulse pattern then corresponds to the local pulse pattern at the modulo-2-adder 73, for this pulse pattern is a version delayed over a time interval 5D of the local pulse pattern at the modulo-2- adder 68. When the next control pulse from the synchronizing receiver 39 occurs, the counter 82 connected to the modulo-2- adder 73 in the integrating network 28 will then reach its final position and will provide a signal of binary value 1. As already extensively described, this signal resets the binary counter 94 in the PCM-decoding circuit 30 and subsequently makes the passage of the counting pulses from pulse generator 91 to the ring counter 90 and the binary counter 94 possible. The ring counter 90 then progresses from the position in which AND-gate 84 is open and reaches the new positon after 5 counting pulses in which position AND-gate 89 is opened for the signal from the counter 82 connected to the modulo-2-adder 73. The output signal from the AND-gate 89 then prevents the counting pulses from being further applied to the counters 90 and 94 and resets the counters 82 to their zero position for the next integration. Since the counting pulses causing the ring counter 90 to progress are simultaneously counted in the binary counter 94, this counter 94 has thus counted 5 counting pulses in this case and its contents exactly correspond to the amplitude value 5 of the sample in a binary form. The sample obtained with the aid of the weighting network 98 then indeed has the same amplitude value as the sample applied to the amplitude-to-pulse-rate converter 9, 42 in the transmitter of FIG. 3.

In this manner the successive samples of the speech signal are transmitted very reliably while even in case of high probabilities of interference in the transmission path the realibility of the speech transmission is ensured also by the use of the steps described with reference to the receiver of FIG. 4. In case of poor signal-to-noise ratios in the transmission path it is preferred to control the inhibitor gates 80 by means of clock pulses having a higher pulse repetition frequency than that of the clock pulses for the local pulse pattern generator 8' by incorporating, for example, a frequency multiplier in the line leading to these inhibitor gates 80. Then the number of positions of the counters 82 is of course increased accordingly. Due to this step the information present in the received signals is optimally utilized for determining the sudden phase changes in the transmitted pulse pattern.

As compared with the transmission system of FIG. 1, the transmission system described with reference to FIG. 3 and FIG. 4 has the advantage that due to the use of differential state modulation the local pulse pattern generator 8' need not be stabilized on the phase of the received pulse pattern. As a result the length of the integration interval in the transmission system according to FIGS. 3 and 4 may be chosen to be shorter than that for the system of FIG. 1. The length $pT$ of this integration interval is, for example, $2T$ in the transmission system according to FIG. 3 and FIG. 4 instead of $5T$ for the transmission system of FIG. 1.

Figure 5:
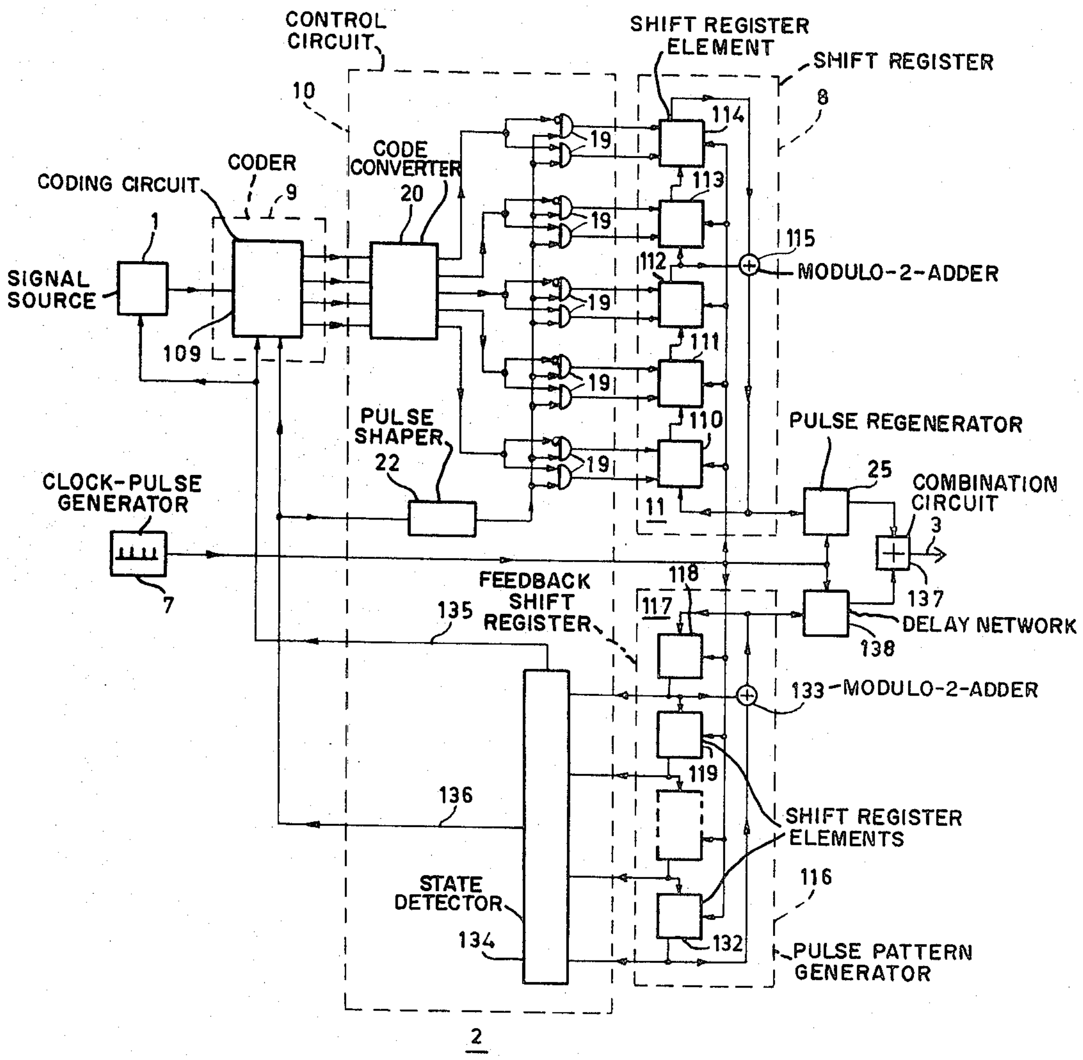
FIG. 5 shows a transmitter and FIG. 6 shows a receiver of a modification of the transmission system of FIG. 1 employing an advantageous synchronizing method.
Figure 6:
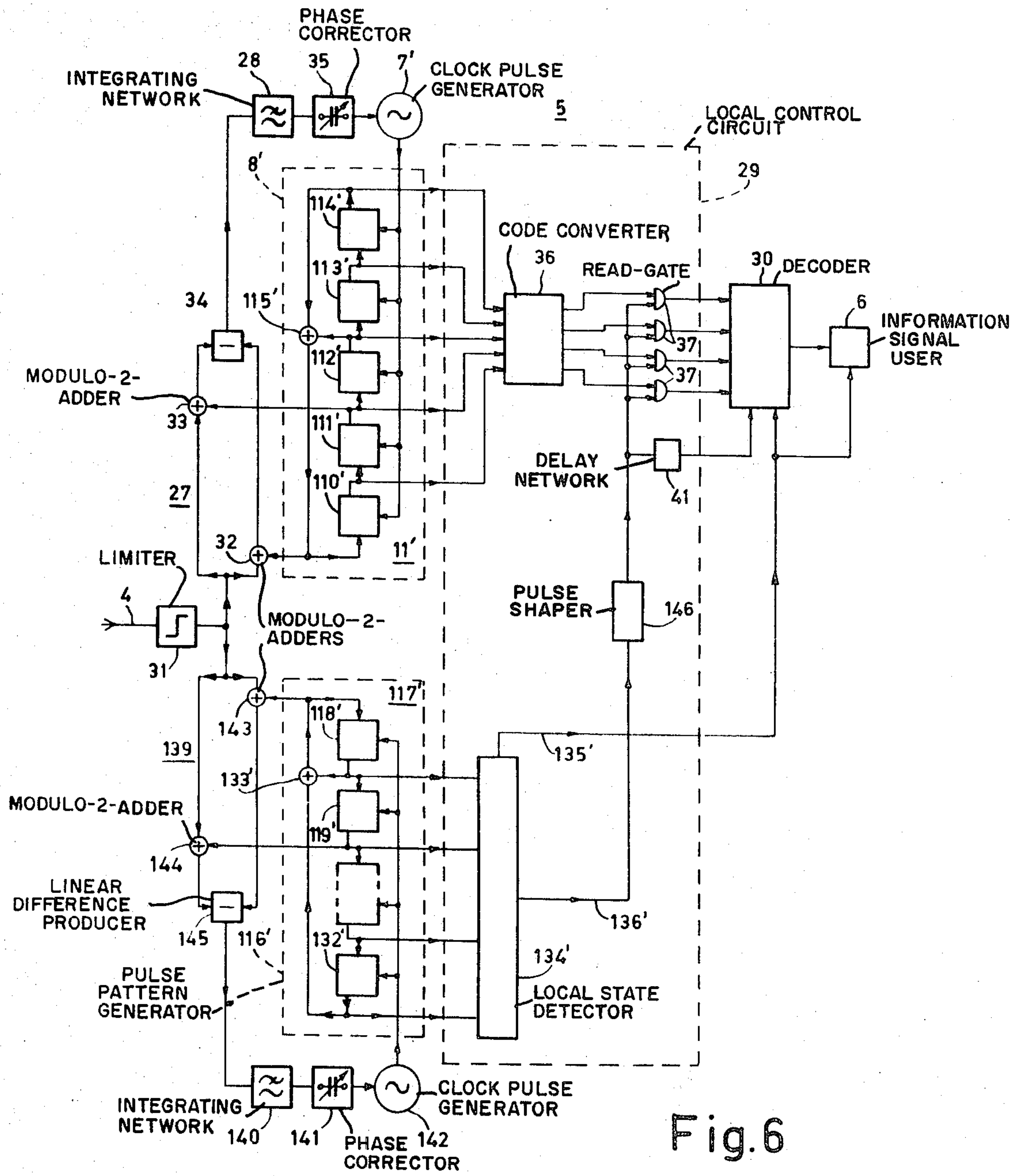

The transmitter and receiver of a transmission system according to the invention are shown in FIG. 5 and FIG. 6, respectively, in which for the transmission of the synchronizing signals it is not necessary to use a separate synchronizing channel and in which furthermore similar steps are used as those in the previously described transmission systems for the transmission of the information signals themselves. The relevant transmission system is particularly adapted for the transmission of telemetry signals. As regards the structure and operation for the transmission of the telemetry signal itself, the transmitter of FIG. 5 and the receiver of FIG. 6 are very much like the transmitter and the receiver of FIG. 1; elements in FIG. 5 and FIG. 6 corresponding to elements in FIG. 1 are therefore denoted by the same reference numerals.

As regards the transmission of the information signal itself, the structural differences between the relevant transmission system and that of FIG. 1 are a direct result of the fact that a telemetry signal instead of a speech signal is transmitted.

Thus, in the transmitter of FIG. 5 a telemetry signal originating from the signal source 1 is converted in the form of a number consisting of 7 decimals in the coder 9 with the aid of a coding circuit 109 which supplies the decimals in series and passes each decimal as a binary code group having 4 code elements in a parallel form to the control circuit 10. These code groups are converted in the code converter 20 into code groups having 5 code elements in accordance with a 2-out-of-5 code which is particularly suitable for characterizing a decimal because in this code exactly 10 different code groups can be distinguished. Accordingly the shift register 11 in the pulse pattern generator 8 then includes five shift register elements 110, 111, 112, 113, 114, the outputs of the shift register elements 112 and 114 being connected through a modulo-2- adder 115 to the input of the shift register 11. The generation cycle of the pulse pattern generator 8 therefore comprises $(2^5-1) = 31$ generation states and the pulse pattern which will hereinafter be denoted by $S_1$ has a period $T_1 = (2^5-1)D = 31D$.

Likewise as in FIG. 1 the local pulse pattern generator 8' in the receiver of FIG. 6 corresponds to the pulse pattern generator 8 of FIG. 5 in which the correspoinding elements of FIG. 6 have the same reference numerals provided with indices. The code converter 36 is formed as an inverse circuit of the code converter 20 in FIG. 5 and in this case it is thus formed by a 2-out-of-5 decoding circuit. Likewise the decoder 30 is formed in the same manner as the decoding circuit associated with the coding circuit 109 of FIG. 5, which decoding circuit converts the recovered code groups into the associated decimals and passes the 7 decimals occurring in series of the original number again as a telemetry signal to the information signal user 6.

The decimals of the telemetry signal are transmitted in the relevant transmission system with the aid of the jump-transitions in the pulse pattern $S_1$ and this proceeds in entirely the same manner as the transmission of the samples of the speech signal in the transmission system of FIG. 1.

Unlike the previous transmission systems a periodical binary pulse pattern is employed also for the required synchronization, which pulse pattern will be referred to as $S_2$ in which the pulses also occur in the rhythm of the clock pulses from clock pulse generator 7 whose period $T_2$ is integral multiple of the period $T_1$ of the pulse pattern $S_1$ which is utilized for the transmission of the telemetry signal itself. This pulse pattern $S_1$ consisting of $(2^n-1)=31$ pulse may thus have 31 different phase positions relative to the pulse pattern $S_2$. In the embodiment shown the period $T_2$ corresponds to the number of periods $T_1$ used for the full transmission of the 7 decimals of a telemetry signal.

In order to be able to use for the transmission of the pulse pattern $S_2$ similar equipment as for the transmission of the pulse pattern $S_1$ a maximum-length-shift-register-sequence is also chosen for the pulse pattern $S_2$ so that there applies for a period $T_2$:

$T_2 = (2^y-1)D = CT_1 = c(2^n-1)D$ *in which in this case* $n=5$ and $T_1=(2^5-1)D=31D$. If *y* is chosen to be, for example, 15 it is found that $C = 7 \times 151$, tbat is to say, the period $T_1$ fits exactly $7 \times 151$ times in the period $T_2$. It follows for this embodiment that a time interval of $151T_1$ is available for the transmission of each decimal.

For generating this pulse pattern $S_2$ the transmitter of FIG. 5 is provided with a second pulse pattern generator 116 which is formed as a maximum-length-shift-register-sequence generator. To this end the pulse pattern generator 116 comprises a feedback shift register 117 having 15 shift register elements 118, 119, –,132, whose contents are shifted by the clock pulse generator 7 at a shift period D and in which the outputs of the second and the last shift register elements 119 and 132, respectively, are connected through a modulo-2- adder 133 to the input of the first shift register element 118. The generation cycle of the second pulse pattern generator 116 therefore comprises $(2^{15}-1)=32767$ generation states and the pulse pattern $S_2$ thus has the desired period $T_2=(2^{15}-1)D = 32767$ D.

In the control circuit 10 of the transmitter shown the control pulses for the control of the coding circuit 109 and the write gates 19 are derived from the generation states of the second pulse pattern generator 116 using the fact that each generation stage only occurs once for each generation cycle and each generation state is unambigiously determined by the contents of the shift register 117. To this end the control circuit 10 includes a state detector 134 which is constituted, for example, by 8 AND-gates not further shown in FIG. 5 the inputs of which are connected to the outputs of the shift register elements 118–132. The connection of the AND-gates is constituted in such a manner that one of the AND-gates provides a contorl pulse when the shift register comprises, for example, exclusively pulses of binary value 1. This control pulse via a first output line 135 causes the telemetry signal from the signal source 1 to be taken over in the coding circuit 109. After this signal has been taken over, the other 7 AND-gates each provide a control pulse once in the generation cycle, namely at instants which are regularly distributed over the cycle and are particularly spaced over a time interval 151 $T_1$. These control pulses are passed on through a second output line 136 which is common for the 7 AND-gates to the coding circuit 109 for coding the separate decimals of the telemetry signal which has been taken over, and are also passed on to the write gates 19 through the pulse shaper 22. As in the transmitter of FIG. 1 these control pulses encounter a delay in the pulse shaper 22 such that the code group characterizing a decimal in the pulse pattern generator 8 is written in exactly between two successive clock pulses, namely before the coding circuit 109 handles the next decimal.

In this manner the transmission process for the telemetry signal in the transmitter is completely controlled by the second pulse pattern generator 116. The second pulse pattern $S_2$ is then linearly combined as a synchronizing signal with the first pulse pattern $S_1$ in a combination circuit 137 and both pulse patterns are simultaneously passed on through line 3 to the transmission path. The connection between the second pulse pattern generator 116 and the combination circuit 137 incorporates a delay network 138 to compensate for the delay of the first pulse pattern $S_1$ in the pulse regenerator 25. In FIG. 5 this delay network 138 is likewise constituted by a shift register element which is controlled by the clock pulse generator 7.

Also in the receiver of FIG. 6, similar equipment as for the recovery of the pulse pattern $S_1$ in the transmission of the telemetry signals is used for the recovery of the pulse pattern $S_2$ operating as a synchronizing signal. To this end the pulse patterns derived from line 4 are applied to a second product modulator 139 an input of which is connected to a local second pulse pattern generator 116' which corresponds to the second pulse pattern generator 116 in the transmitter and whose output is connected to an integrating network 140 having a time constant which is at least of the same order as the period $T_2$ of the pulse pattern $S_2$. The output signal from this integrating network 140 controls a phase corrector 141 constituted, for example, as variable reactance of an oscillator 142 which operates as the second local clock pulse generator, namely for the local second pulse pattern generator 116'.

In the receiver shown the local second pulse pattern generator 116' is formed in the same manner as the second pulse pattern generator 116 in the transmitter of FIG. 5, corresponding elements in FIG. 6 having the same reference numerals and being provided with indices. Likewise as the product modulator 27, the product modulator 139 has a digital and double structure in which in FIG. 6 the two product modulators commonly utilize the slicer 31. Furthermore, the product modulator 139 includes two modulo-2- adders 143, 144 whose first inputs are connected in parallel to the output of the slicer 31 and whose outputs are connected to a linear difference producer 145 whose output is connected to the integrating network 140. The local pulse pattern $S_2$ applied to the input of the shift register element 118' is then also applied to the second input of the modulo-2- adder 143 while the local pulse pattern $S_2$ delayed over two shift periods D and occurring at the output of the shift register element 119' is applied to the second input of the modulo-2- adder 144.

The phase stabilization of the second local clock pulse generator 142 on the phase of the transmitted second pulse pattern $S_2$ is effected in entirely the same manner as the phase stabilization of the local clock pulse generator 7' on the phase of the transmitted first pulse pattern $S_1$. After phase stabilization is obtained the local and received pulse patterns coincide so that apart from the transit time delay in the transmission path the pulse pattern generators at the transmitter and receiver ends 8 and 8' and 116 and 116', respectively, are in the same generation state at any instant. As already extensively described hereinbefore, this phase stabilization is performed with great reliability also in the case of transmission through transmission paths having very poor transmission conditions.

Both the phase stabilization of the local clock pulse generator 7' on the phase of the transmitted first pulse pattern $S_1$ and the phase stabilization of the second local clock pulse generator 142 on the phase of the transmitted second pulse pattern $S_2$ are only slightly hindered by the fact that in the relevant transmission system the pulse patterns $S_1$ and $S_2$ are linearly combined in the transmitter of FIG. 5 and are transmitted without any time separation or frequency separation in a common frequency band, and that consequently the linear combination $S_1 + S_2$ of the pulse patterns $S_1$ and $S_2$ in the receiver of FIG. 6 is applied to both product modulators 27, 139. The reason thereof is that both pulse patterns $S_1$ and $S_2$ in which the pulse occur in an irregular alternation in the rhythm of the clock pulses do not have any correlation with the noise in the transmission path, but are also substantially uncorrelated relative to each other. This means that not only the received noise but also the part of the received linear combination of both pulse patterns $S_1 + S_2$ constituted by the pulse pattern $S_2$ substantially does not contribute to the integration signal at the output of the integrating network 28 which is in contrast with the contribution of the part of this combination $S_1 + S_2$ constituted by the pulse pattern $S_1$, which contribution is in fact proportional to the number of pulses per period $T_1$ of the pulse pattern $S_1$. Such reasoning likewise applies to the integration signal at the output of the integrating network 140 to which only the part of the received linear combination $S_1 + S_2$ constituted by the pulse pattern $S_2$ contributes.

As a result it is possible to transmit both pulse patterns $S_1$ and $S_2$ simultaneously in a common frequency band so that in the relevant transmission system no separate time-space or frequency-space is necessary for the transmission of the synchronizing signal and in spite of this both the telemetry signal and the synchronizing signal can be reliably transmitted with only slightly mutual interferences. The already slight interfering influence of the synchronizing signal on the transmission of the telemetry signal may be further reduced when pulse pattern $S_2$ is combined with pulse pattern $S_1$ in the linear combination circuit 137 of the transmitter of FIG. 5 at a lower level than that of the pulse pattern $S_1$. This lower level of the pulse pattern $S_2$ does not detract in practice from the reliability of the synchronization because in fact the integration of the received pulse pattern $S_2$ in the receiver of FIG. 6 is effected over a time interval which is approximately a factor of $T_2/T_1$ larger than the integration interval for the pulse pattern $S_1$.

A further possibility to reduce the already slight mutual interferences of the pulse pattern $S_1$ and $S_2$ is to construct the two product modulators 27, 139 in analog techniques, the received signals being directly applied to the analog modulators without the interposition of the slicer 31. If frequency transposition is effected in the transmission over the transmission path, a further possibility to reduce the mutual interferences of the pulse patterns $S_1$ and $S_2$ consists in the use of orthogonal modulation in the frequency transposition stages for which the pulse pattern $S_1$ is modulated on a carrier at the transmitter end and the pulse pattern $S_2$ is modulated on a 90° shifted version of the same carrier, while the two transmitted pulse patterns $S_1$ and $S_2$ are separately reocvered at the receiver end by means of coherent orthogonal demodulation.

In the local control circuit 29 of the receiver of FIG. 6 the control pulses for the read gates 37 and the decoding circuit 30 are derived in the same manner as in the transmitter of FIG. 5 from the generation states of the second pulse pattern generator 116'. To this end this local control circuit 29 includes a local state detector 134' which is constituted in the same manner as the state detector 134 of FIG. 5. The control pulse occurring at a first output line 135' of the state detector 134' causes the number of 7 decimals recovered in the decoding circuit 30 to be passed on as a telemetry signal to the information signal user 6, while the control pulses occurring at the second output line 136' are applied through a pulse shaper 146 to the read gates 37. As in the transmission system of FIG. 1, the pulse shaper 146 then gives the control pulses such a delay that they occur at the end of the time interval having a length $151T_1$ subsequent to a jump-transition in the received pulse pattern $S_1$ exactly when the local pulse pattern generator 8' is in the generation state which is characteristic of the relevant decimal. Furthermore these control pulses have to cocur just between two successive local clock pulses from clock pulse generator 7' but special steps need not be taken for this purpose, because after phase stabilisation is obtained the local clock pulses from clock pulse generator 7' coincide with those from the second local clock pulse generator 142. In the receiver shown the delay in the pulse shaper 146 is exactly one shift period D shorter than the delay in the pulse shaper 22 of the transmitter of FIG. 5.

In this manner the transmission process for the information signal in the relevant transmission system is entirely controlled by the second pulse pattern generators at the transmitter and receiver ends 116 and 116', the information signal and the synchronizing signal being transmitted simultaneously in a common frequency band and in spite of this an accurate mutual synchronisation of the two pulse pattern generators 116 and 116' is effected.

As regards the relation between the period $T_2$ of the pulse pattern $S_2$ and the period $T_1$ of the pulse pattern $S_1$, if both pulse patterns are maximum-length-shift-register-sequences, it maximum-length-shift-sequences, be proved that the aforementioned relation:

$$T_2 = (2^y - 1)D = C(2^n - 1)D = CT_1$$

with $y$, $n$ and $C$ being an integer and $y = n$ may be satisfied if $y = mn$ with $m$ being an integer.

Many modifications of the embodiments described are possible within the scope of the present invention. For example, the transmission system described with reference to FIG. 5 and FIG. 6 may be utilized without drastic changes for the transmission of 7 speech channels in time multiplex by means of pulse code modulation, each speech signal occupying the place of a decimal of the telemetry signal and the clock, word and frame synchronization may be effected with the aid of the pulse pattern $S_2$. Likewise, the synchronizing method of the transmission system of FIG. 5 and FIG. 6 may be employed in the transmission system of FIG.

1 of of FIG. 3 and FIG. 4. When used in the transmission system of FIG. 1, in which $n = 4$, for example, $y = 8$ yeilds a time interval $pT$ equal to 17 $T_1$ between the jump-transistions of the pulse pattern $S_1$, and when used in the transmission system of FIG. 3 and FIG. 4 in which $n = 3$, for example, $y = 6$ results in that a time interval $pT_1 = 9T_1$ may be utilized for the integration of the received pulse pattern $S_1$.

What is claimed is:

1. A transmission system for transmitting information from an information signal source to an information signal user, comprising a transmitter; and a receiver; the transmitter comprising a clock pulse generator, pulse pattern generator means for periodically producing an ordered series of different binary words in response to the clock pulses, the individual bits of each word occurring non-periodically within the series, coder means coupled to the information signal source for producing a quantized coded signal corresponding to the information signals to be transmitted, and a control circuit means connected to the output of the coder means for changing the word in the pulse pattern generator to a word of the series corresponding to the quantized coded signal, the control circuit means operating at time intervals equal to an integral number of periods of the periodically produced ordered series of binary words, whereby a phase change hereinafter referred to as a jump-transition and corresponding to the quantized coded signal is effected by the control circuit means; the receiver comprising a local pulse pattern generator means for peoducing the same ordered series of binary words produced by the transmitter pulse pattern generator means, a product modulator means connected to the pulse pattern generator of the transmitter and to the local pulse pattern generator for comparing the transmitted binary words to the locally generated binary words, an integrator connected to the output of the product modulator means, a local control circuit means operating in synchronism with the transmitter control circuit means and coupled to the integrator for producing at the end of each period of the received pulse series a local control signal corresponding to the jump-transitions, and a decoder means connected to the signal user and to the local control circuit for decoding the local control signals into a form compatable with the signal user.

2. A transmission system as claimed in claim 1, wherein the transmitter further comprises means connected to the clock pulse generator for providing control pulses having a frequency equal to the frequency of the periodically produced ordered series of binary words, means connecting the control pulses to the control circuit means for controlling the same, a synchronizing transmitter connected to the control pulses for transmitting a synchronizing signal to the receiver, and wherein the receiver further comprises a synchronizing receiver for receiving the transmitted control pulses, and means connecting the output of the synchronizing receiver to the local control circuit for controlling the same.

3. A transmission system as claimed in claim 2, wherein the transmitter further comprises a second pulse pattern generator means controlled by the clock pulse generator for periodically producing a second ordered series of different binary words the second series having a period equal to an integral multiple of the period of the first series, the individual bits of each word occurring non-periodically within the second series, a state detector means connected to the second pulse pattern generator for providing control pulses for the control circuit, and means for transmitting the second pulse pattern to the receiver as a synchronizing signal; the receiver further comprising a second product multiplier, a second local pulse pattern generator corresponding to the second pulse pattern in the transmitter, means applying the transmitted second pulse pattern and the output of the second local pattern generator to the second product modulator for deriving an output corresponding to the difference between the two second pulse series, a second integrating network connected to the outupt of the second product modulator, a local clock pulse generator connected to the local second pulse pattern generator means connecting the output of the integrator as a phase correcting input to the local clock pulse generator and a local state detector means connected to the local second pulse pattern generator for providing control pulses for the lcoal control circuit.

4. A transmission system as claimed in claim 1, wherein the control circuit in the transmitter further comprises write gates connected to the first pulse pattern generator for writing the control signal from the coder into the first pulse pattern generator.

5. A transmission system as claimed in claim 1, wherein the receiver further comprises a local clock pulse generator, means for applying the output of the first integrating network in the receiver to the local clock pulse generator as a phase correction signal, and means connecting the local clock pulse generator to the lcoal first pulse pattern generator thereby providing a means for locking the phase of the local clock pulse generator pulse series to the phase of the pulse series from the transmitter pulse pattern generator.

6. A transmission system as claimed in claim 5, wherein the local control circuit in the receiver comprises a read circuit connected to the local first pulse pattern generator, read gates connected to the local first pulse pattern generator for providing a local control signal to the decoder at the end of each pulse series received from the trasnmitter.

7. A transmission system as claimed in claim 1, further comprising a modulo-2-combination circuit connected to the first pulse pattern generator in the transmitter, the modulo-2-combination circuit comprising means for connecting the first pulse pattern generator to the receiver, an amplitude-to-pulse-rate converter connected to the information signal source for providing auxiliary clock pulses corresponding to the quantized amplitude value of the information signal, a register connected to the modulo-2-combination circuit, and an adjusting circuit connected to the amplitude pulse rate converter and having a number of positions corresponding to the number of binary words in the periodically produced ordered series of binary words, a position of the adjusting circuit determined by the auxiliary clock pulse rate effecting a transfer of the modulo-2-combination circuit information into the register.

8. A transmission system as claimed in claim 1, wherein the receiver further comprises a modulo-2-combination circuit connected to the first local pulse pattern generator, wherein the product modulator comprises a plurality of individual modulators corresponding to the number of binary words in the periodically produced ordered series of binary words, a first input of each individual modulator being commonly connected to the input of the receiver, a second input of each individual modulator being connected to the modulo-2- combination circuit, the integrator connected to the product modulator comprising a separate integrator connected to each individual modulator.

* * * * *

PO-1050
(5/69)

UNITED STATES PATENT OFFICE
CERTIFICATE OF CORRECTION

Patent No. 3,758,861 Dated September 11, 1973

Inventor(s) FRANK DE JAGER ET AL

It is certified that error appears in the above-identified patent and that said Letters Patent are hereby corrected as shown below:

Col. 1, line 52, before "is" insert --output of the product modulator--;

Col. 9, line 25, "also when" should be --although--;

line 34, "wit" should be --with--;

Col. 11, line 26, "givn" should be --given--;

Col. 12, line 48, "limited" should be --limiter--;

Col. 13, line 5, "shaft" should be --shift--;

Col. 14, line 10, "outout" should be --output--;

line 18, "wich" should be --which--;

line 67, "gqoup" should be --group--;

Col. 16, line 9, "output" should be --input--;

Col. 18, line 52, "correspoind" should be --correspond--;

Col. 19, line 22, "c" should be --C--; "in which in this case" should not be italized;

line 24, "tbat" should be --that--;

PO-1050
(5/69)

UNITED STATES PATENT OFFICE
CERTIFICATE OF CORRECTION

Patent No. 3,758,861 Dated September 11, 1973

Inventor(s) FRANK DE JAGER ET AL

It is certified that error appears in the above-identified patent and that said Letters Patent are hereby corrected as shown below:

Col. 19, line 47, "stage" should be --state--;

Col. 22, line 5, "reocvered" should be --recovered--;

line 28, "cocur" should be --occur--;

line 50, cancel "maximum-length-shift-"

line 51, cancel "sequences," and insert --may--;

Col. 23, line 3, "yeild" should be --yield--;

IN THE CLAIMS

Claim 1, line 22, "peoducing" should be --producing--;

Claim 3, line 27, "lcoal" should be --local--;

Claim 5, line 7, "lcoal" should be --local--.

Signed and sealed this 12th day of March 1974.

(SEAL)
Attest.

EDWARD M.FLETCHER,JR.
Attesting Officer

C. MARSHALL DANN
Commissioner of Patents